N. SEHNER.

Improvement in Apparatus for Applying Chalk to Locomotive Wheels.

No. 4,924. Reissued May 28, 1872.

Witnesses.

Franklin Darritt.

Richard Gerner

Inventor.

Nathaniel Sehner

PER Henry Gerner

BEST AVAILABLE COPY

UNITED STATES PATENT OFFICE.

NATHANIEL SEHNER, OF HAGERSTOWN, MARYLAND, ASSIGNOR TO HIMSELF, JONATHAN H. SEYMOUR, AND ALFRED R. APPLEMAN, OF SAME PLACE.

IMPROVEMENT IN APPARATUS FOR APPLYING CHALK TO LOCOMOTIVE-WHEELS.

Specification forming part of Letters Patent No. 124,165, dated February 27, 1872; reissue No. 4,924, dated May 28, 1872.

*To all whom it may concern:*

Be it known that I, NATHANIEL SEHNER, of Hagerstown, in the county of Washington and State of Maryland, have invented certain new and useful Improvements in Apparatus for Applying Chalk to Railroad Wheels or Rails; and do hereby declare the following to be a full, clear, and exact description thereof, reference being had to the accompanying drawing and to the letters of reference marked thereon.

The nature of my invention consists in the attachment, to a locomotive or dummy, of an apparatus which shall, when required, furnish chalk in any suitable form to the wheels and rails for the purpose of producing friction, instead of using sand, which is now the practice, by which the wheels and rails are destroyed.

Figure 1:
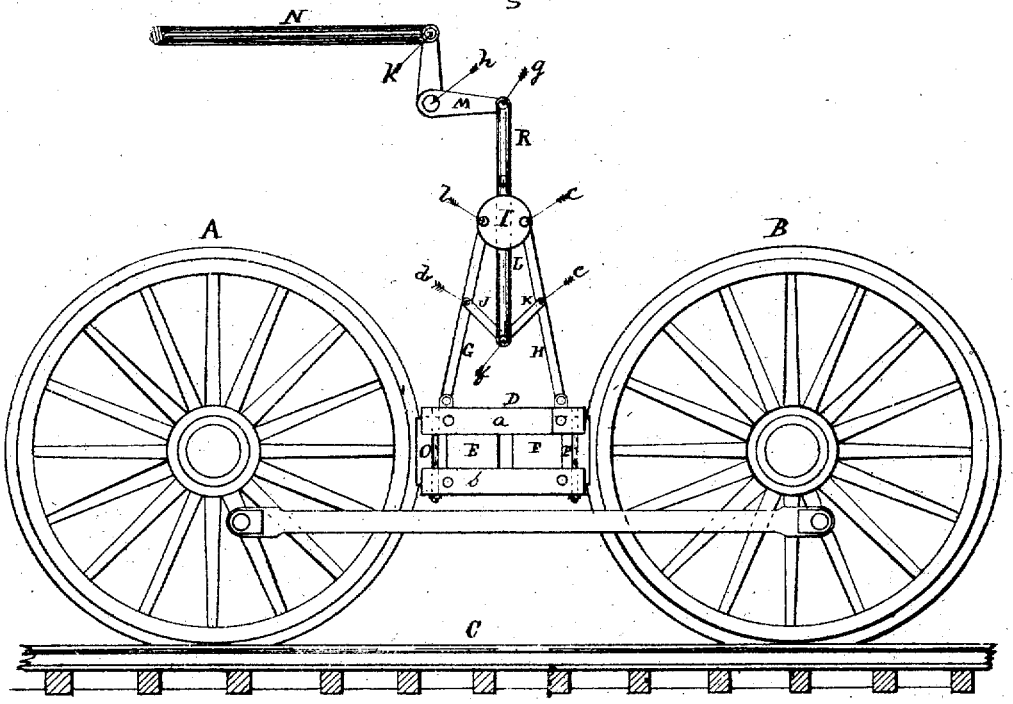
Figure 2:
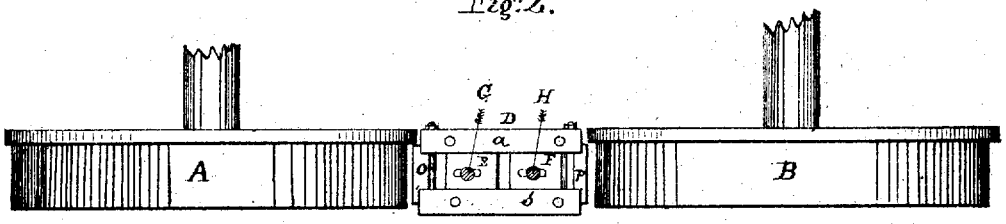

In the accompanying drawing, Figure 1 is a side view of one form of an apparatus employed by me embodying my invention, and Fig. 2 is a plan view of the same.

A and B are two wheels of a locomotive or dummy, C. The rail D is a frame, constructed of two parts, *a* and *s*, bolted together, and held in its place and position by bolts attached to the boiler and frame of the locomotive or dummy. E and F are two boxes with one end closed; the other ends, facing the wheels, left open. Two rods, G and H, are pivoted to the top of said boxes, said rods being pivoted at the points *a* and *c* to the ring I. Two other rods, J and K, are pivoted to the rods G and H at points *d* and *e*, said rods pivoted together at the point *f*. A rod, L, is pivoted to the point *f*, and extends through the ring I upward to the point *g*, where it is again pivoted to the elbow-lever M, which is pivoted to the fixed point *h*, and at the point *k* pivoted to the lever or handle N, which extends within reach of the engine-driver or fireman. R is a connection-rod, which forms the upper part of the rod L. Two pieces of chalk, O and P, of suitable form, are placed in the boxes E and F, one piece in each box.

It will easily be understood that by pushing the lever or handle N the two boxes E and F are brought nearer together, and, consequently, the chalk withdrawn from the wheels; and, also, by reversing the motion of the lever or handle N—that is, by pulling—the two boxes will be separated or brought nearer to the wheels, by which operation the chalk will touch the tire of the wheel and make a deposit thereon, as well as on the rail in proportion to the length of time and force employed in pressing the chalk against the wheel.

In practice I attach one apparatus to each side of the locomotive, worked with one lever, by aid of which all four wheels are chalked at the same time.

It is evident that the mode of applying chalk to the wheels and rails for the purpose of producing friction may be varied in several ways. Hence I do not confine myself to any particular device or apparatus for this purpose.

Having thus fully described my invention, what I claim as new, and desire to secure by Letters Patent, is—

A device for holding chalk, and a device for operating the same, in combination with the wheels of a railroad engine, for the purpose of applying chalk to said wheels or railroad rails.

In testimony that I claim the foregoing I have hereunto set my hand this 9th day of April, 1872.

NATHANIEL SEHNER.

Witnesses:
JACOB C. COOKERLY,
HENRY BOMBERGER.